(12) United States Patent
Zhao

(10) Patent No.: US 7,117,360 B1
(45) Date of Patent: Oct. 3, 2006

(54) CRL LAST CHANGED EXTENSION OR ATTRIBUTE

(75) Inventor: Michelle Zhao, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1113 days.

(21) Appl. No.: 09/902,254

(22) Filed: Jul. 9, 2001

(51) Int. Cl.
*H04L 9/32* (2006.01)

(52) U.S. Cl. ............. 713/158; 713/160; 713/161; 713/175

(58) Field of Classification Search .......... 713/158, 713/160, 161, 175
See application file for complete search history.

(56) References Cited

U.S. PATENT DOCUMENTS

| | | | | |
|---|---|---|---|---|
| 5,481,601 A | * | 1/1996 | Nazif et al. | 379/201.03 |
| 5,687,235 A | * | 11/1997 | Perlman et al. | 713/158 |
| 6,128,740 A | * | 10/2000 | Curry et al. | 713/158 |

\* cited by examiner

*Primary Examiner*—Justin T. Darrow
(74) *Attorney, Agent, or Firm*—Osha Liang LLP

(57) ABSTRACT

A method and apparatus for generating a CRL with a last_changed extension. When sequential CRLs are generated there is the potential that there will be no changes in the data associated with the CRL. In this case a recipient of the new CRL may needlessly perform processing on the new CRL. A CRL consistent with embodiments of the present invention provides an extension to specify the CRL number of the last_changed CRL. This provides the recipient with information to determine whether the new CRL should be processed or the existing data is up to date.

16 Claims, 6 Drawing Sheets

CRL LAST CHANGED EXTENSION OR ATTRIBUTE

FIELD OF THE INVENTION

This invention relates generally to the field of digital certificates and certificate revocation lists (CRL). More particularly, this invention relates to a method and apparatus for providing an extension to a standard CRL that informs the recipient if changes have or have not been made since the last CRL.

BACKGROUND OF THE INVENTION

Digital certificates are in wide use on the Internet and in the field of electronic commerce for authentication of all sorts of electronic transactions. In general, such digital certificates are used to certify the identity of an entity in the digital world, particularly as defined by the public key infrastructure (PKI). As digital certificates are issued and used, they often are either revoked or expire after a predetermined amount of time. In other situations, a digital certificate may be revoked or placed on hold pending some event. In order for digital certificates to be useful, it is important that those entities using digital certificates to authenticate the identity of an entity presenting the digital certificate have confidence that the digital certificate is valid. Generally, the validity of a digital certificate can be determined by reference to a Certificate Revocation List (CRL) produced by an authority that generates the certificates (usually a Certificate Authority).

FIG. 1 depicts a simple exemplary computer network 100 that utilizes a digital certificate and a Certificate Revocation List. In system 100, a user terminal 104 may request via a network (for example the Internet) 108, a digital certificate from a Certificate Authority 112. The Certificate Authority 112 generates and issues the certificate, which is returned to the user terminal 104. The user terminal 104 can then utilize the digital certificate to carry out the transaction with another entity such as remote server 116. Such transactions may include financial transactions or any other transaction in which the identity of the user terminal 104 should be reliably authenticated.

When user terminal 104 sends the digital certificate to remote server 116, the remote server 116 can inspect the digital certificate against a list of revoked certificates (the Certificate Revocation List) stored by the remote server 116. In the event remote server 116 has not obtained a recent CRL, one can be requested from the Certificate Authority 112. Certificate Authority 112 then either generates a new CRL or sends the most recently generated CRL to the remote server 116. Remote server 116 can then determine whether nor not the digital certificate sent by user terminal 104 is valid. Thus, remote server 116 can authenticate the user terminal 104 and determine whether or not to authorize particular transaction at hand.

FIG. 2 depicts a message flow diagram 200 for the transaction just described. In this message flow diagram, a certificate request 204 is sent from the user terminal 104 to the Certificate Authority 112. The Certificate Authority 112 generates a certificate at 208 and returns the certificate at 212 to the user terminal 104. The user terminal 104 can then submit a transaction using the certificate at 218 to the remote server 116. Remote server 116 can then request a new CRL at 222 of the Certificate Authority. The Certificate Authority 112 then generates or retrieves a CRL at 226 and sends the CRL to the remote server 116 at 230. Depending on the nature of the transaction, the remote server 116 may process the CRL at 232 by taking various actions including, for example, sorting, filtering or reformatting the CRL and storing information in its own database. At 234, the certificate can be authenticated against the CRL data at the remote server 116. At 238 the transaction can be either approved or rejected in accordance with the authentication at 234 and at 242 the approval or rejection can be confirmed with the user terminal 104. Those skilled in the art will recognize that many other message flows are possible with the message flow 200 if FIG. 2 being intended as exemplary of a simple use of a digital certificate and a Certificate Revocation List.

With reference to FIG. 3 the Certificate Authority 112 may generate the Certificate Revocation List in accordance with process 300. CRLs are generated at the Certificate Authority either on a periodic basis, or as a result of some event such as a certificate is revoked, or some combination thereof. The process starts at 302 after which a database of certificates is queried for certificates meeting a particular criteria of inactivity. One example is for the query to request all certificates that have been revoked. Other certificates are assumed to still be valid and active.

At 304 the certificate database at the Certificate Authority responds to the query with certificates meeting the specified criteria. Header information is then generated, for example, in accordance with X.509 and RFC 2459 standards (or other applicable CRL standards) at 312 and at 316 the certificate is formatted (for example, as an ASN.1 or other format CRL). The digital certificate is signed at 320 to assure its authenticity and is then stored at 322 within a computer residing at the Certificate Authority. The process returns at 326. Whenever a request is made for a new digital certificate, process 300 is carried out or, in some instances, the most recently generated CRL may be retrieved and forwarded to the requester.

When a CRL as generated in accordance with process 300 is sent to the remote server as in 232 of process 200, the remote server may carry out any number of processes on the CRL at 232. Such processes may include merging the CRL into existing databases, reformatting the CRL or taking other potentially computationally intensive actions. When a process such as process 300 is carried out at specified time intervals, it is possible that there has been no change in the CRL since the last CRL was sent to remote server 116. In this case, such processes at 232 are redundant and wasteful. It is therefore desirable to minimize or eliminate such processing to allow the network to carry out its functions in a responsive manner.

As digital certificates find wider use, the number of such certificates issued has increased dramatically. With this increase comes an associated increase in the number of entries in a Certificate Revocation List. Accordingly, the processing at 232 as just described can become an extremely time consuming process, depending on the nature of the processing required. This is obviously undesirable since the process of authentication using the CRL should preferably be carried out in an expedient manner.

SUMMARY OF THE INVENTION

The present invention relates generally to digital certificates and certificate revocation lists. Objects, advantages and features of the invention will become apparent to those skilled in the art upon consideration of the following detailed description of the invention.

In one embodiment consistent with the present invention, a method and apparatus for generating a CRL with a last_changed extension. When sequential CRLs are generated there is the potential that there will be no changes in the data associated with the CRL. In this case a recipient of the new CRL may needlessly perform processing on the new CRL. A CRL consistent with embodiments of the present invention provides an extension to specify the CRL number of the last_changed CRL. This provides the recipient with information to determine whether the new CRL should be processed or the existing data is up to date, advantageously saving processing time if no new processing is required.

A method of creating a digital certificate revocation list (CRL) in a manner consistent with an embodiment of the present invention includes creating a list of digital certificates satisfying at least one inactive criterion; identifying a latest CRL in which changes have been made to the list; and storing an identity of the latest CRL in which changes have been made as a part of the CRL.

A method of using a digital certificate revocation list (CRL), in a manner consistent with an embodiment of the present invention, includes storing a first CRL, the first CRL comprising at least a list of digital certificates satisfying at least one inactive criterion and a first CRL identifier; carrying out a processing operation on the first CRL; receiving a second CRL, the second CRL comprising at least a list of digital certificates satisfying the at least one inactive criterion, a second CRL identifier and an identity of a latest CRL having differences with the list of certificates satisfying the at least one inactive criterion; and carrying out the processing operation on the second CRL only if the identity of the latest CRL having differences with the list of certificates satisfying the at least one inactive criterion is more recent than the first CRL.

A data structure consistent with an embodiment of the present invention, stored on a computer readable storage medium or transported over an electronic communication medium, for a digital certificate revocation list (CRL), includes a list of digital certificates satisfying at least one inactive criterion; a CRL identifier; and an identity of a latest CRL having differences with the list of digital certificates satisfying the inactive criterion.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
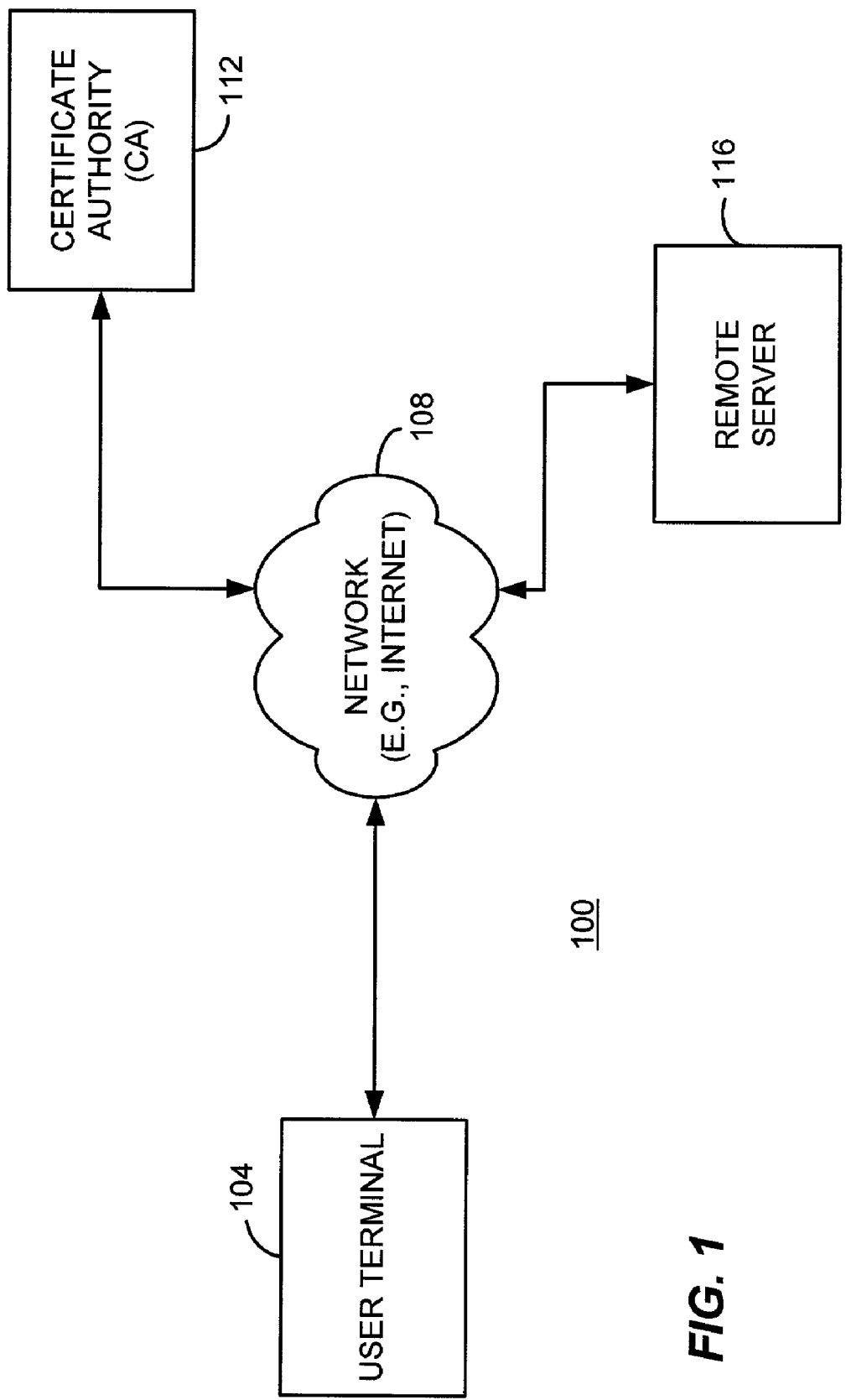
FIG. 1 illustrates a simple exemplary system using digital certificates.
Figure 2:
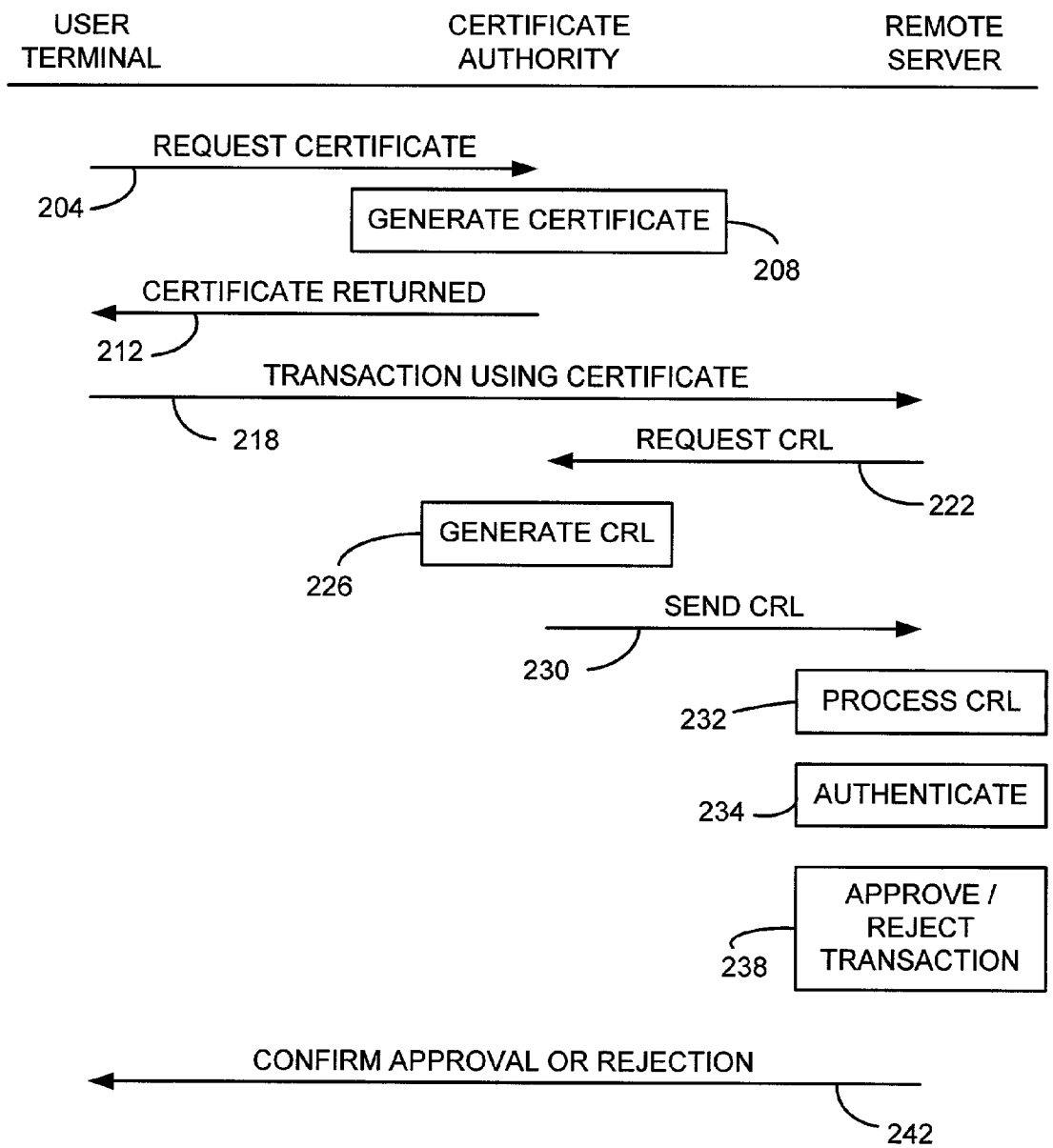
FIG. 2 is a signal flow diagram describing one use of a digital certificate and certificate revocation list in the system of FIG. 1.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "sending" or "receiving" or "authenticating" or "generating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

CRL Last Changed Extension or Attribute in Accordance with the Invention

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

It is desirable to minimize or eliminate the processing of a CRL that has not changed since the most recently received CRL. Currently, there is no main mechanism for accomplishing this. The present invention utilizes an extension to the standard CRL format to introduce a field referred to herein as "last_changed". This field indicates provides an identifier of the CRL (i.e., the CRL number) of the last CRL that has been changed since the current CRL.

Figure 3:
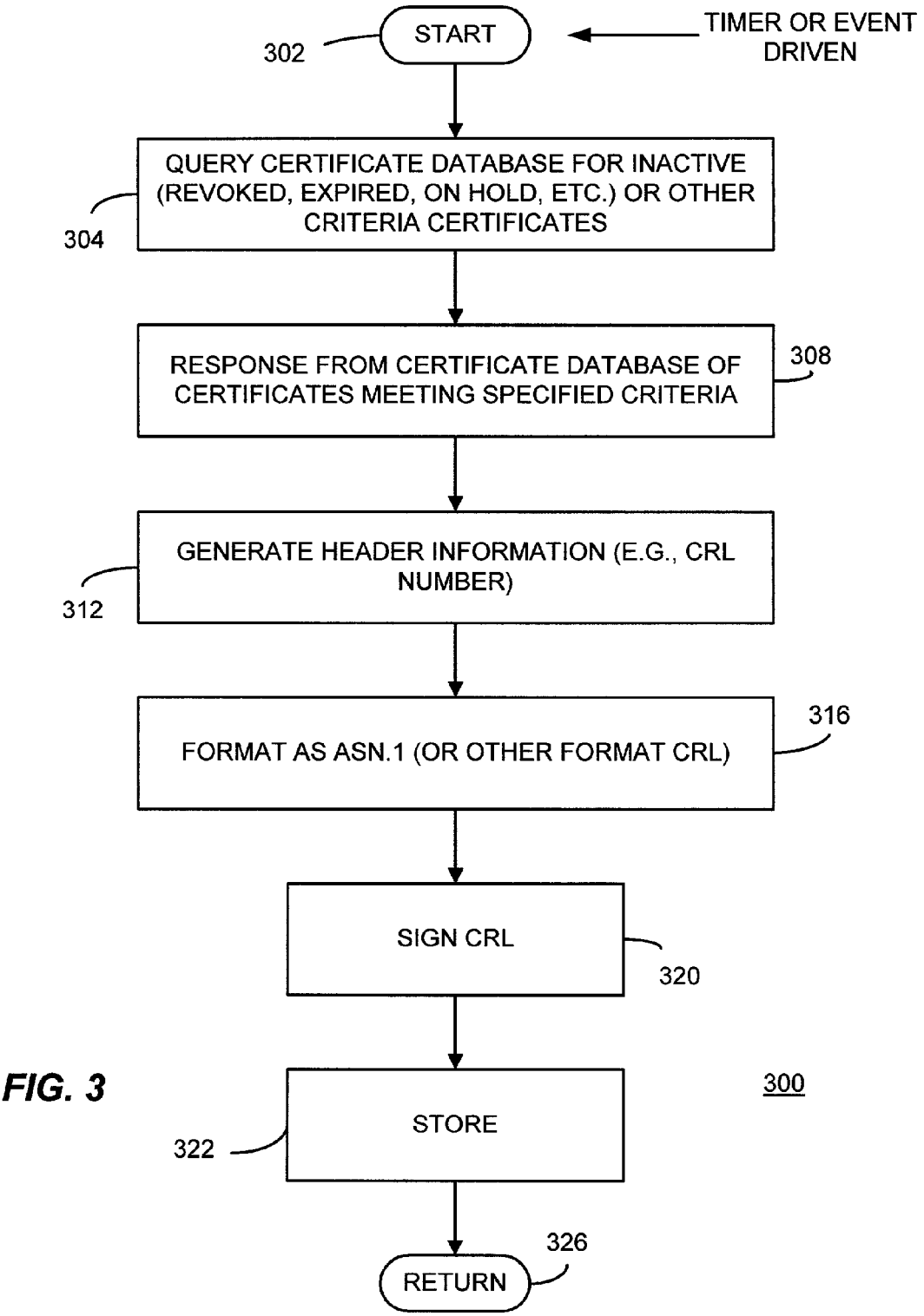
FIG. 3 is a flow chart describing generation of a CRL.
Figure 4:
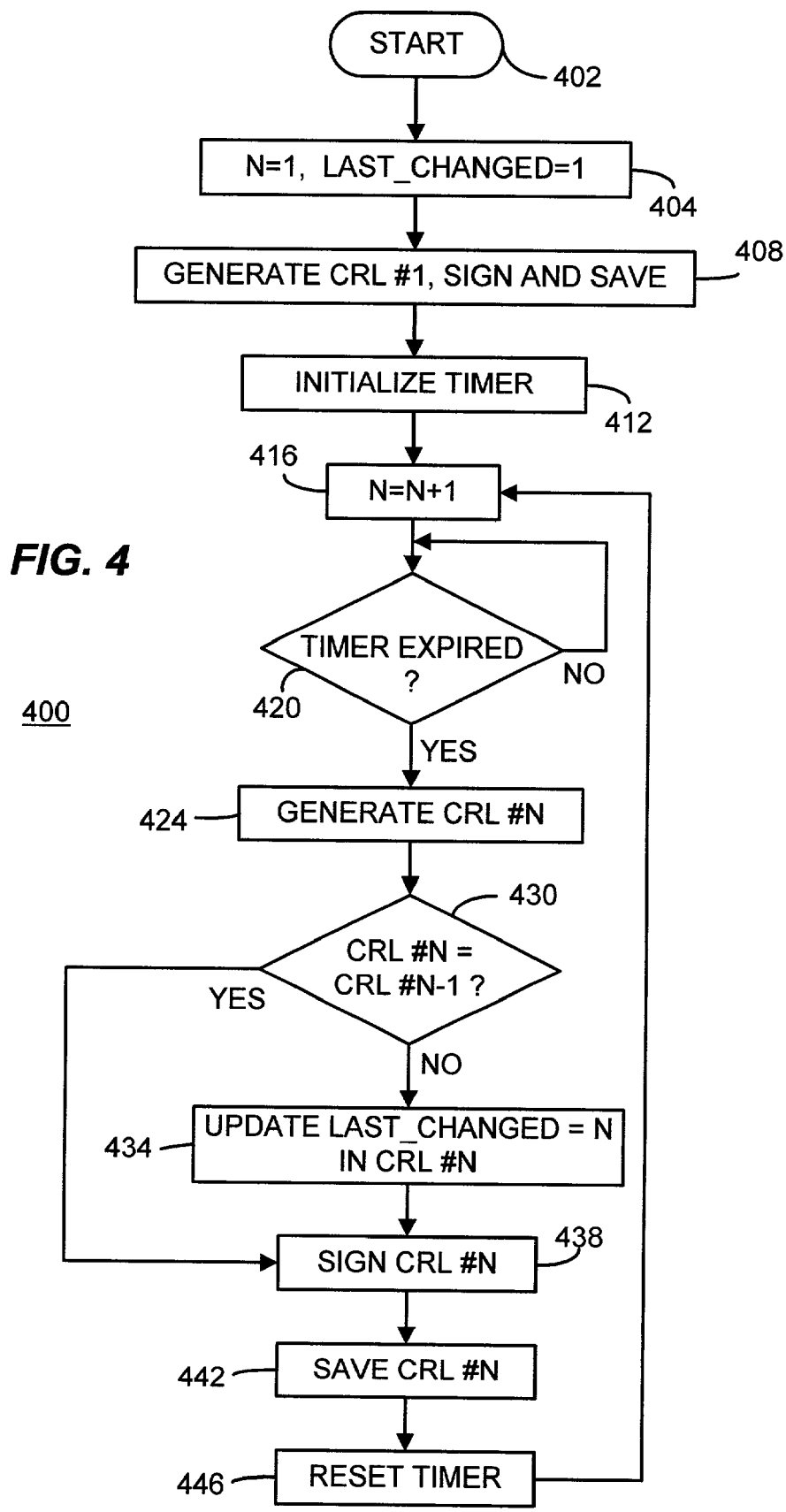
FIG. 4 is a flow chart describing one method consistent with an embodiment of the present invention for generation of a CRL having a Last_Changed field as an extension.

In order to implement this change in one embodiment, process 400 in FIG. 4 is utilized starting at 402. At 404 an integer N and the variable last_changed are both initialized at a value of 1. At 408, CRL #1 is generated, signed and saved using a technique such as data process 300 of FIG. 3 or any other suitable process. A timer is then initialized at 412 and the value of the counter N is incremented by 1 at 416. The timer initialized at 412 is utilized to establish the periodic time intervals between generation of new Certificate Revocation Lists. The timer is inspected at 420 to determine if it has expired and the process awaits expiration of the timer at 420.

When the timer has expired at 420, CRL #N is generated at 424. At 430, the data entries listing the revoked certificate numbers in CRL #N are compared to those entries in CRL #N−1 to determine if any change has taken place. If any change has taken place, those entries will be different and control passes to 434. At 434 the value of last_changed is updated to N in CRL #N. CRL #N is then signed at 438 with a digital signature and saved at 442. The timer is then reset at 446 and control returns to 416 where the value of N is incremented and the process repeats.

In the event CRL #N's data is equal to the data at CRL #N−1 at 430, 434 is skipped and the process proceeds to 438 where the CRL #N is signed, saved at 442 and the timer is reset at 446. In this manner, the value of last_changed is incremented whenever there is a change in two adjacently generated certificate revocation lists. Thus, when terminal 116 receives a new CRL, it can determine whether or not processing should be carried out in the new CRL by simply reading the value of last_changed. This is depicted in connection with FIG. 5 as process 500.

Figure 5:
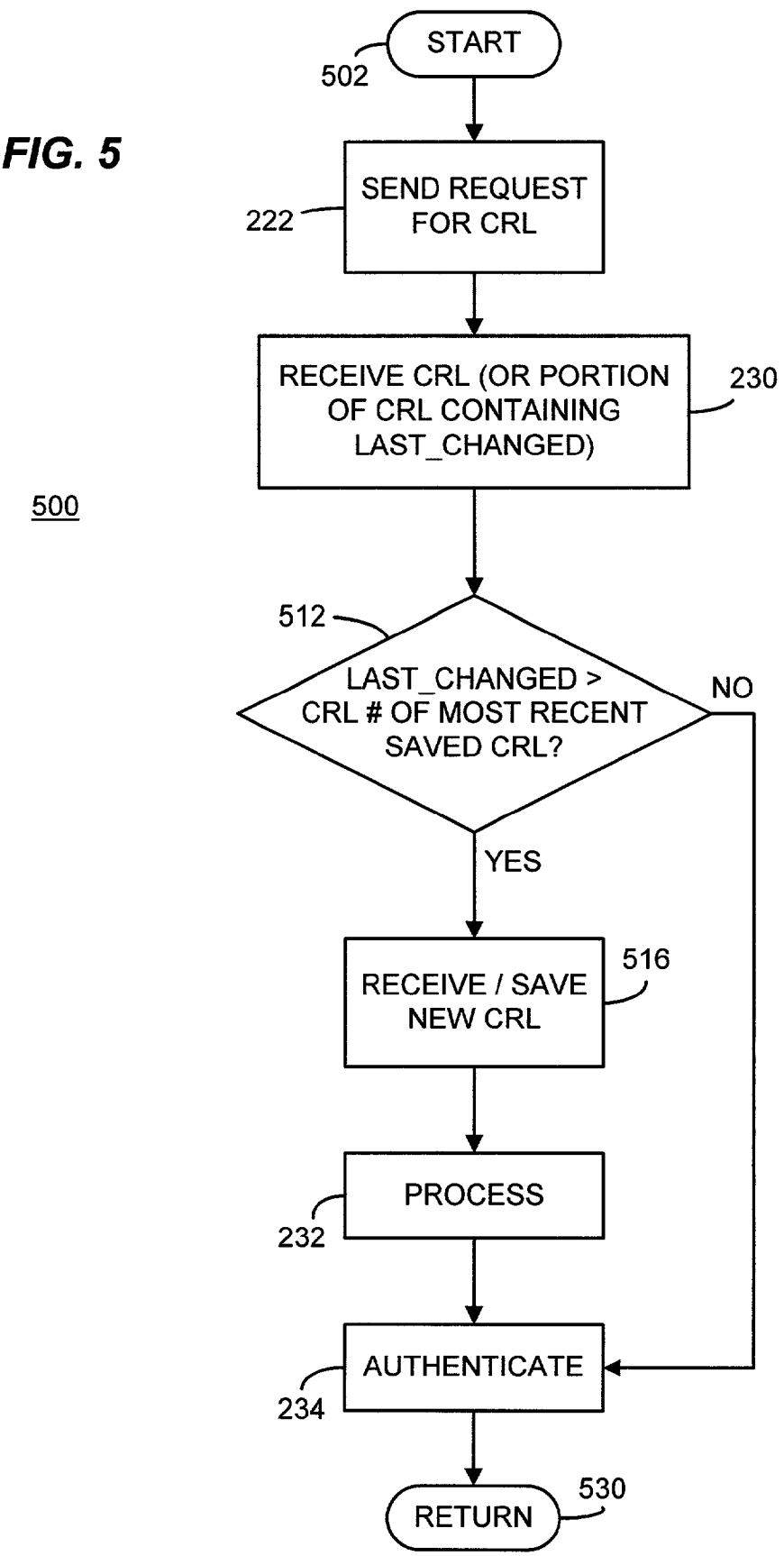
FIG. 5 is a flow chart depicting processing of a CRL at the server 116 in accordance with an embodiment consistent with the present invention.

Process 500 of FIG. 5 starts at 502 after which a request is sent to the Certificate Authority at 222. At 230, CRL is received from this Certificate Authority. In one embodiment, once the portion of the CRL containing the last_changed is received, the remaining portion of the CRL can be ignored or rejected. In other embodiments the entire CRL is received at 230. At 512, the value of last_changed is compared to the CRL number of the most recently saved CRL at the server 116. If last_changed is greater than the CRL number of the most recently saved CRL at 512, then the new CRL is saved at 516 (or, if necessary, the remainder is first received) and a new CRL is processed at 232 and the certificate is authenticated at 234 before returning at 530. In the event the value of last_changed is not greater than the CRL number of the most recently saved CRL at 512, 516 and 232 can be skipped and the process proceeds directly to authentication using the previously received CRL (whose data has not been changed). In this manner, the process in 232 of the new CRL can be avoided if there is no change in the data between the most recently received CRL and the current CRL at server 116.

Figure 6:
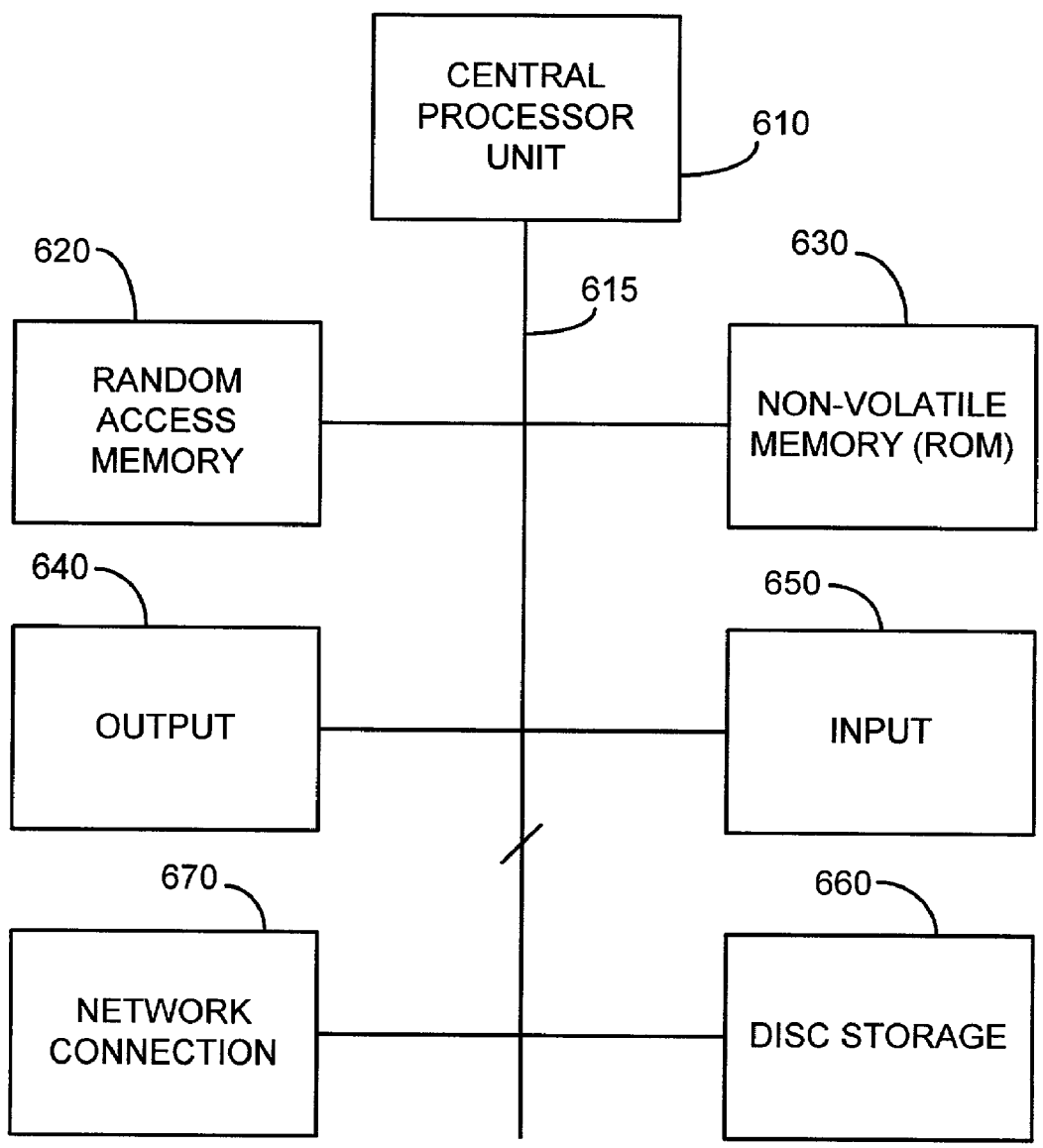
FIG. 6 illustrates a computer system suitable for use in conjunction with embodiments of the present invention.

Referring now to FIG. 6, the process of FIG. 4 can be carried out at the certificate authority using a computer system such as that illustrated in FIG. 6 as 600. Similarly, the process of FIG. 5 can be carried out in a computer system such as 600 in server 116. Computer system 600 includes a central processor unit (CPU) 610 with an associated bus 615 used to connect the central processor unit 610 to Random Access Memory 620 and Non-Volatile Memory 630 in a known manner. An output mechanism at 640 may be provided in order to display or print output for the computer administrator. Similarly, input devices such as keyboard and mouse 650 may be provided for the input of information from the computer administrator. Computer 600 also may include disc storage 660 for storing large amounts of information such as the list of certificates issued and the most recent Certificate Revocation List as well as any other information as required. Computer system 600 is coupled to the network (e.g., the Internet) using a network connection 670 such as an Ethernet adapter coupling computer system 600 through a fire wall and/or locally a network to the Internet.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form, and that can be stored in any suitable electronic storage medium or that can be transmitted over any electronic communication medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of creating a digital certificate revocation list (CRL), comprising:
   creating a list of digital certificates satisfying at least one inactive criterion;

identifying a latest CRL in which changes have been made to the list; and storing an attribute indicating the CRL as being the latest as a part of the latest CRL.

2. The method according to claim 1, further comprising formatting as an ASN.1 format CRL with the attribute of the latest CRL as an extension to the format.

3. The method according to claim 1, wherein the identifying comprises comparing the list with entries in a previously generated CRL.

4. The method according to claim 1, wherein the creating, identifying and storing are carried out at regular time intervals.

5. The method according to claim 1, further comprising applying a digital signature to the CRL.

6. An electronic storage medium storing instructions which when executed on a programmed processor carry out the method of creating a digital certificate revocation list according to claim 1.

7. The method according to claim 1, wherein the at least one inactive criterion comprises at least one of a hold status criterion, an expired status criterion and a revoked status criterion.

8. The method according to claim 1, further comprising transmitting the CRL to a recipient over an electronic communication medium.

9. A method of using a digital certificate revocation list (CRL), comprising:

storing a first CRL, the first CRL comprising a list of digital certificates satisfying at least one inactive criterion, a first CRL identifier, and a first attribute for indicating if the first CRL is the latest CRL;

carrying out a processing operation on the first CRL;

receiving a second CRL, the second CRL comprising a list of digital certificates satisfying the at least one inactive criterion, a second CRL identifier, and a second attribute for indicating whether the second CRL is the latest CRL wherein the second CRL is the latest CRL if changes have been made to the list of the second CRL compared to the list of first CRL; and carrying out the processing operation on the second CRL only if the second attribute of the second CRL indicates that the second CRL is the latest CRL.

10. The method according to claim 9, wherein the processing operation comprises storing the list of digital certificates satisfying the inactive criterion.

11. The method according to claim 9, wherein the processing operation comprises storing the list of digital certificates satisfying the inactive criterion as a part of a database.

12. The method according to claim 9, wherein the processing operation comprises filtering the list of digital certificates based on inactive criteria.

13. The method according to claim 9, wherein the processing operation comprises authenticating a digital certificate against the second CRL.

14. The method according to claim 9, wherein the at least one inactive criterion comprises at least one of a hold status criterion, an expired status criterion and a revoked status criterion.

15. The method according to claim 9, wherein the first and second CRL are received over an electronic communication medium.

16. An electronic storage medium storing instructions which when executed on a programmed processor carry out the method of using a digital certificate revocation list according to claim 9.

* * * * *